Feb. 11, 1941. F. M. GIDDINGS 2,231,267
CUTTING AND SCRAPING DEVICE
Filed April 18, 1940  2 Sheets-Sheet 1
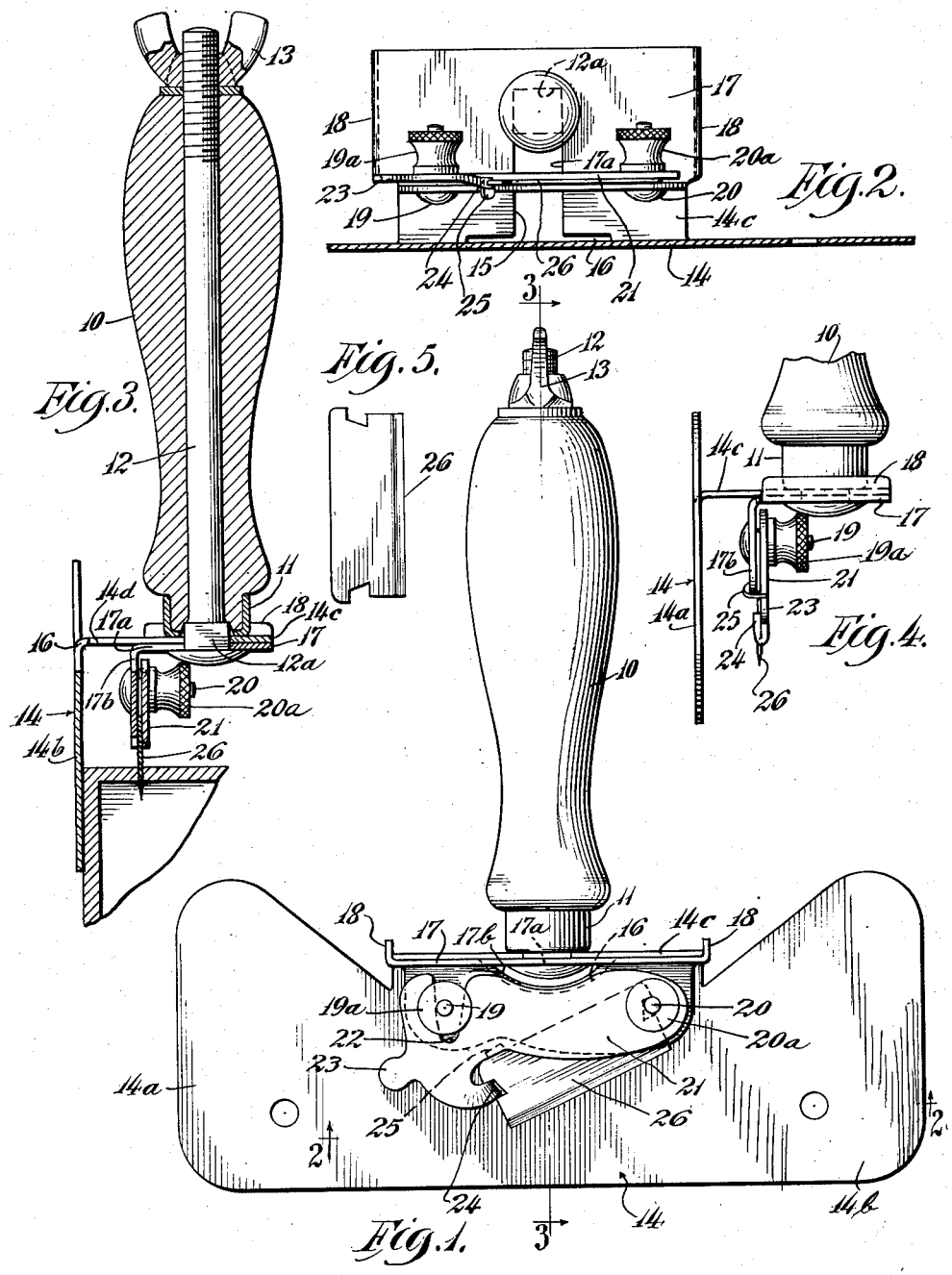
Inventor:
Fred M. Giddings
By John H. Brezina
Attorney

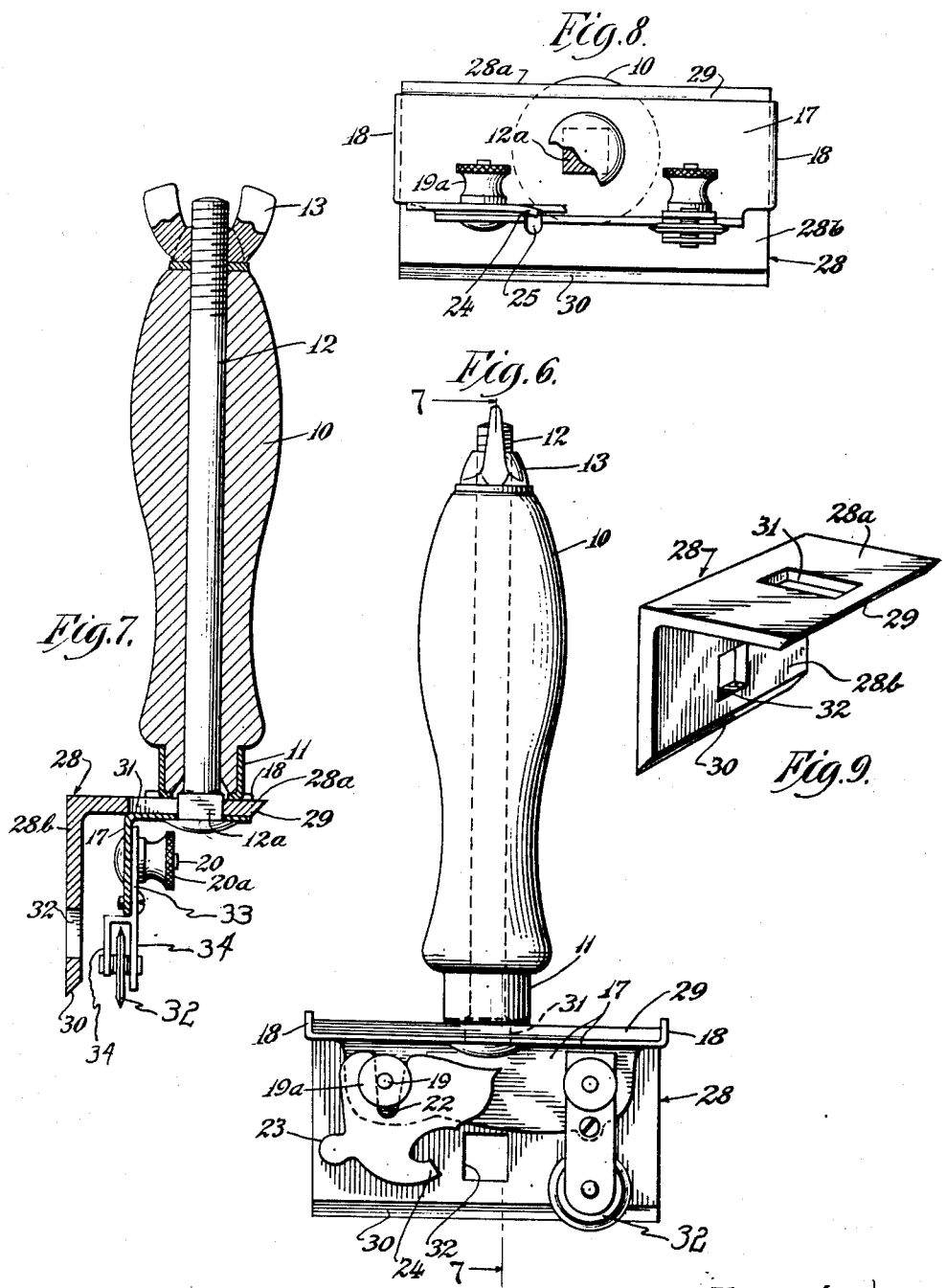

Patented Feb. 11, 1941

2,231,267

UNITED STATES PATENT OFFICE 2,231,267

CUTTING AND SCRAPING DEVICE

Fred M. Giddings, Galesburg, Ill.

Application April 18, 1940, Serial No. 330,347

12 Claims. (Cl. 30—2)

My invention consists of an adjustable novel cutting and scraping tool and device adapted for numerous industrial and household uses, and of the type which is adapted to be disassembled to provide for attachment and detachment of the replaceable cutting blades and sharpening and replacement of the scraper portion.

An important object of my invention is the provision of an adjustable cutting scraper device for a removably mounted guide member attachable to the handle portion whereby the mounted cutting blade is guided along and adjacent the edge of a shipping container or the like so as to wholly or partly cut off the container top.

A further object of my invention is the provision of a device of the described class wherein a double blade scraper of angular cross section in combination with a detachable handle and a separate scraping member attachable to the handle and to the scraper, the clamping member releasably and adjustably mounting a cutting blade in a position to project the blade cutting edge in the general direction of one of the scraper edges and being so assembled to permit selective use of the scraper blade as a guide for the separate cutting blade.

A further object of my invention is the provision of an adjustable mounting member for holding a replaceable cutting blade in desired position with respect to a handle, and selectively and optionally, in desired position relative to a combination scraper and guide member, to permit selective or simultaneous use of the device for cutting, slitting and scraping.

Other important objects of my invention will be apparent from the following description and claims.

On the drawings:

Fig. 1 is a side elevational view of my cutting and scraping device in one assembled position.

Fig. 2 is a cross sectional view taken on line 2—2 of Fig. 1.

Fig. 3 is a vertical cross sectional view taken on line 3—3 of Fig. 1.

Fig. 4 is an end elevation with a part of the handle broken away, looking at one edge of the guide member and one edge of the blade mounting member.

Fig. 5 is an elevation of a typical cutting blade usable in my device.

Fig. 6 is an elevational view of my invention utilizing an angular scraper usable simultaneously as a guide member.

Fig. 7 is a cross sectional view taken on line 7—7 of Fig. 6.

Fig. 8 is a bottom plan view of the combined scraper, blade mounting member and blade in normal operating position, and looking at the cutting edges.

Fig. 9 is a perspective view of the angular scraper and guide element forming part of my invention.

Referring to Figs. 1, 3, and 4, reference numeral 10 designates a longitudinally passaged handle, which may be of wood, composition or any suitable material and which preferably has on one end the exterior centrally apertured bushing 11. Numeral 12 designates a suitable bolt, preferably of the flat head-type, having a square shank portion 12a adjacent the head thereof, and having its opposite end suitably threaded to provide for the removable mounting of a wing nut, designated by reference numeral 13.

Reference numeral 14 is a metal guide member of substantially angular cross-section, the particular form illustrated being of right-angled cross-section. Guide member 14 includes integral oppositely projecting wing portions 14a and 14b, the angularly bent intermediate portion or flange 14c thereof being provided with a recess or slot 15 which extends from a point adjacent the lateral edge of the intermediate portion 14c to the corner juncture indicated by reference numeral 14d; said slot 15 terminates in an enlarged arcuate shaped coincident opening 16, which is of a size to permit insertion and removal of the head of bolt 12. The width of the elongated portion of slot 16 is such as to snugly engage the square shank portion 12a of bolt 12 so that when said bolt is mounted in position, guide member 14 and bolt 12 will not rotate with respect to each other.

Referring to Figs. 1, 2, and 3, reference numeral 17 designates a metal right-angled bracket-like head or mounting member, preferably of right-angled cross-section, which is provided with a transversely extending slot 17a, which extends from points adjacent one lateral edge thereof to and through the corner juncture to terminate in an arcuate shaped or rounded enlarged recess 17b, which is of sufficient size to permit passage therethrough of the head of bolt 12, and which recess 17b may be formed of substantially similar shape to that of the oval-like recess 16 of the guide member 14. The width of the slot 17a is likewise such as to engage the non-round shank portion 12a of bolt 12 to prevent rotation of said bolt with respect to blade mounting and clamping member 17.

It will be apparent that the head of the bolt 12 may be inserted either simultaneously or successively through the enlarged recesses 16 and 17a to the position illustrated in Figs. 3 and 4, while the handle 10 is mounted on the bolt 12; namely that a mere loosening of wing nut 13 will release the frictional engagement and clamping action between the head of the bolt 12 and the bushing 11 and permit either mounting or dismounting of said handle and bolt and thereby permit assembly or disassembly of blade clamping member and head 17 and guide member 14.

The recessed section of the clamping head 17 is preferably provided at its opposite ends with angularly and outwardly bent flanges or lugs 18 which are spaced apart so as to snugly receive the narrower portion or flange 14c of the guide member 14 in order to prevent undesirable movement of said clamping member 17 when in use. The perpendicularly bent flange 17b of the clamping head 17 is provided with a pair of spaced apart bolt receiving apertures which are located substantially at the opposite ends thereof, and in which are mounted removable bolts 19 and 20 respectively, said bolts carrying knurled nuts 19a and 20a respectively.

A metal clamping plate 21, which is stamped and formed from a suitable metal blank, has one apertured end pivotally and removably mounted on bolt 20 and nut 20a. Clamping plate or member 21 is provided at its opposite end with a side opening recess 22, which is so located that said recess 22 will substantially receive and partially encircle the bolt 19 and so that the nut 19a will, when tightened, engage the outer surface of the clamping plate 21 adjacent side recess 22 to hold said plate in the desired position.

Said clamping plate 21, though not necessarily, is provided with an outwardly extending grippable integral lug 23 which provides a miniature grip on the handle to move the clamping plate 21 into the desired position for tightening the nuts 19a and 20a. Said clamping plate 21 is also provided in the particular form illustrated in the drawings with a back-turned hook-like integral extension 24 which is preferably formed integrally therewith, and which in the particular illustration in the drawings extends toward the opposite end of said clamping plate 21. This hook-like extension 24 is adapted to engage the end recesses of a replaceable cutting blade, or may, in the case of use of blades of shapes different to that illustrated engage only the end edges of such blades.

The retaining and clamping plate 21 is also preferably provided with a perpendicularly extending stop stud 25, preferably formed integral therewith and extending from the lateral edge of clamping member 21 to points adjacent to the hook-like extension 24. This stop stud 25 engages the rear edge of a replaceable blade and prevents inward slipping of the blade when in use. This stop stud 25 is best illustrated in Figs. 4 and 8 respectively and shown in dotted lines in Figs. 1 and 6. The stop stud 25 may be transposed and located at the desired point upon the retaining and clamping plate 21 to meet the requirement of the particular size and type of cutting blade employed.

Reference numeral 26 designates any one of a plurality of forms of replaceable cutting blades, which in the illustration of the drawings is a "Christy" razor blade having end recesses therein, one end recess engaging the bolt 20 and the other recess being engaged by the hook-like extension 24, so as to securely though removably clamp and mount the blade 26 in any one of a number of inclined or diagonal positions with respect to the guide member 14 and bracket-like clamping member 17. I desire it to be understood that the clamping plate 21 may by pivoting movement be clamped in any one of a number of inclined positions to hold the cutting blade 26 in any one of a number of angular positions most suitable to the particular work to be performed. Further, I desire it to be understood that cutting blade 26 may be mounted in any desired angular position and even perpendicularly, that is in positions substantially perpendicular to the longitudinal central lines of the guide member 14 and bracket-like mounting or clamping member 17, and without regard to engagement of the hook-like extension 24.

It will be noted particularly in Figs. 2, 3, and 4, that the plane in which the cutting blades 26 are mounted is spaced apart from the general plane of guide member 14, this to provide for sliding the inner surface of guide member 14 along either the horizontal, vertical or inclined wall of a box and permitting pulling or pushing movement of my device so as to cut and slit the wall of the box along lines adjacent the corners thereof as indicated in Fig. 3, wherein a fragment of a corner of a typical fibrous box is shown.

In uses requiring the cutting blade edge to be substantially straight, that is, substantially perpendicular with respect to the longitudinal axis of the handle, the guide member 14 may by loosening of wing nut 13 and bolt 12 be removed by slipping the same out from engagement with the head and the clamp bracket or head 17 again tightened with respect to handle 10 and bolt 12 by tightening of wing nut 13. It will be understood that in this form my adjustable device may be used for either straight-edge or curve-linear cutting or may be used for scraping surfaces, for example, glass or painted, varnished and other coated surfaces.

I desire to point out with particular reference to Figs. 2, 3, and 4, that the guide member 14 may be mounted closer or farther away from the blade mounting bracket or head 17 and mounted blade 26 merely by loosening wing nut 13 and sliding the bolt 12 and handle 10 to the desired position in the slot 17a. This adjustability is limited by the length of the central slot 17a of bracket or head 17, and it is of particular advantage in permitting cuts to be made at varying distances from the path of travel of the guide member 14. Further, I desire it to be understood that while I have illustrated one form of typical blade, that other forms and shapes of cutting blades may be mounted either by clamping or by rotatably mounting thereon with respect to the mounting bracket or head 17, either by means of one of the bolts 19 or 20 or by equivalent journalling fastening element.

My adjustable cutter is of particular advantage in the cutting off or trimming of sheets of paper, for example, wall paper or other sheets made of fiber or fibrous composition materials.

Referring to Figs. 6 to 9 inclusive, I illustrated my afore described invention wherein the guide element or guide member takes the form of a metal double edge scraper 28, having flange blades 28a and 28b respectively, substantially at right angles to each other. The blades 28a and 28b have their respective outer edges bevelled inwardly thereof to form sharpened scraping and cutting edges 29 and 30 respectively. The scraper 28 has each of its flange blades 28a and 28b formed with openings 31 and 32 respectively, which openings are preferably of square or rectangular form, the opening 31 being in the form of a slot so as to permit adjustability, that is, adjustment of the position of the bolt 12 and handle 10 in said slot and to vary the distance of the cutting blade and its mounting head 17 from the scraper blade 28b according to the distance that the slit or cut is desired from a container edge.

As clearly shown in Figs. 6 and 7, the bolt 12 may be inserted into either of the openings 31 or 32 so as to mount the bolt 12 and handle 10 in perpendicular relation to one of the blades 28 and in parallel relation to the other blade thereof, the bolt 12 at the same time being inserted through and securing the mounting head 17 to hold the bifurcated metal journalling bracket 33 which has one apertured end detachably held on bolt 20 by nut 20a and its opposed end formed into a yoke comprising arms 34 having aligned apertures therein. A disk cutter 32 is rotatably mounted on pin 36 which passes through and is secured in the aligned apertures of arms 34 of bracket 33.

As before described, tightening of the wing nut 13 clamps and holds the scraper 28 and mounting head 17 securely against the end of the ring collar or bushing 11. When the adjustable device is mounted in the manner illustrated in Fig. 7, my device may be used alternately as a scraper utilizing either the cutting edge 30 in pushing or forward movement or utilizing the cutting edge 29 in pulling movement against the surface being scraped, and in this form the scraper blade 28b is simultaneously utilized as a guide to guide either the disk cutting blade 32 or a blade 26, mounted as in Fig. 1, along or adjacent the edge of a container or the like.

When these functions are performed simultaneously in cutting operation, the inner flat face of the corner portion of the scraper blade 28b is placed upon the flat side, end or bottom of a container and the foremost portion of the cutter blade is pressed into the material being cut and the device drawn manually along the edge, the path of cutting movement being guided by the blade 28b in the same manner described with reference to the guide member 14. As stated, the distance of the cut from the edge of the container being opened, or from the edge of the sheet of paper whose edge is to be cut off, may be adjusted to desire within reasonable limits due to the position of the slot 31 and adjustable mounting of the bolt 12 and handle 10 with respect thereto.

As will be noted particularly with reference to Figs. 6 and 8, the length of the scraper 28 is preferably such that it will fit snugly between the outwardly turned flanges 18 of the slotted portion of the blade mounting head 17, this securely holding the scraper and combination guide member 28 from turning movement and thereby maintaining the cutting blade in parallel relation with respect to one blade portion of the combination scraper and guide member 28.

In Fig. 6 I have also illustrated the manner in which the disk or rolling cutter 32 may be mounted for rotation with respect to bracket 33 and the bolt 20, it being understood that the rotatable position thereof will be substantially the same as that of the blade 26 of Fig. 1, except being rotatable adjacent the outer projecting portion of the mounting head 17. This particular form of device is especially adaptable for trimming wall paper and other relatively thin sheets. In this form, the clamping plate 21 may be omitted, and a washer (not shown) substituted therefor to hold the cutting disk or blade 32 properly in rotative movement thereof.

I desire that it also be understood that my device may be used wholly without the guide member 14 or scraper 28 for various uses wherein it is desirable that the cutting edge be entirely exposed and projected to permit numerous scraping or cutting movements.

In either this form or when scraper 28 or guide blade 14 is mounted thereon, the straight edge type of blade may be inverted and clamped with the cutting edge underneath the clamping plate 21 so as to permit carrying of the unit within the user's pocket.

My invention provides a very useful, efficient cutting tool and scraper adaptable for numerous household, commercial and industrial uses, and provides adjustable means to adapt it to a number of different requirements, only part of which have been herein suggested.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a multiple cutting and scraping device, a metal guide member of substantially right angled cross section having a slot terminating in an arcuate opening; a metal mounting bracket having a slotted flat portion and an apertured integral flange projecting angularly from said flat portion, said apertures being substantially at opposite ends of said flange; a bolt and thumbscrew releasably mounted in one of said apertures; a blade clamping member pivoted at one end on said bolt and having a back turned hook-like finger and having a side opening slot at one end thereof; and a bolt and nut normally passing through said second aperture of said bracket flange and through said slot, said bolts and said clamping member being adapted to releasably hold a disposable cutting blade.

2. In a multiple cutting and scraping device, a metal mounting bracket having a slotted flat portion and an apertured integral flange projecting angularly from said flat portion, said apertures being substantially at opposite ends of said flange; a bolt and thumbscrew releasably mounted in one of said apertures; a blade clamping member pivoted at one end on said bolt and having a back turned hook-like finger and having a side opening slot at one end thereof; and a clamping bolt and handle thereon removably mounted on said mounting bracket, said bolt passing through said second aperture of said bracket flange and through said slot, said bolts and said clamping member being adapted to releasably hold a disposable cutting blade.

3. In an adjustable cutting and scraping device, a mounting bracket-like head of substantially right angled cross section, and having spaced apart apertures in one portion thereof and a side opening slot in its other portion; a clamping member releasably pivoted at one end to one of said head apertures and having a perpendicularly extending stop lug on one edge, having a recess in its opposite edge and having a blade engaging finger on its free end, said clamping member being adapted to releasably clamp and hold a replaceable cutting blade in angular position, said finger engaging one end of said blade; and a grippable handle detachably mounted on said head.

4. In an adjustable cutting and scraping device, a mounting bracket-like head of substantially right angled cross section, and having spaced apart apertures in one portion thereof and a side opening slot in its other portion; a clamping member releasably pivoted at one end to one of said head apertures and having a perpendicularly extending stop lug on one edge, having a recess in its opposite edge and having a blade engaging finger on its free end, said clamping member being adapted to releasably clamp and hold a replaceable cutting blade in position substantially perpendicular to the slotted portion of said head, said finger engaging one end of said blade; and a handle unit releasably mounted on said head comprising a passaged handle and a bolt extending therethrough, the head of said bolt being removable from engagement with said side opening slot.

5. In a multiple and adjustable cutting and scraping device, a substantially right angled bracket-like head portion having a slotted aperture opening at the corner juncture thereof; a grippable handle including a headed bolt removably mounted to extend outwardly from said slotted head portion, said slotted aperture being adapted to permit sliding removal of the head of said handle bolt; a blade clamping member removably pivoted at one of its ends to said head portion; bolt and nut means for releasably securing said blade clamping member; and lugs on said blade clamping member for engaging the edges of a blade.

6. In a multiple and adjustable cutting and scraping device, a substantially right angled bracket-like head portion having a slotted aperture opening at the corner juncture thereof; a grippable handle connected to said head portion; a blade clamping member removably pivoted at one of its ends to said head portion; releasable securing means for holding said blade clamping member to said head; and integrally formed projections on said clamping member for engaging the edge portions of a replaceable blade adapted to be mounted in said device.

7. In a cutting and scraping device adapted for mounting replaceable blades; a substantially right angled apertured head portion; a handle detachably connected to one section of said head portion; a clamping member adjacent one section of said head portion; releasable means for securing a cutting blade between said clamping member and one section of said head; and a removably mounted metal guide member of substantially right angled cross section and having one edge portion normally secured against one section of said head and its other angularly extending portion extending in the same direction as the cutting edge of a blade mounted in said device, said last mentioned guide member portion extending beyond the position of a mounted blade and spaced therefrom.

8. In a cutting and scraping device, an angular apertured clamping head member; a handle; a detachable bolt connecting said handle and said clamping head member; a clamping plate pivotally and adjustably attached on said clamping head and adapted to releasably hold a cutting blade; the aperture in said clamping head being elongated to permit adjustable attachment of said handle and bolt with respect to the said head; and a guide member adjustably connected to said handle and said bolt and adapted to guide the cutting movement of said device with respect to an edge.

9. In a cutting and scraping device, a metal guide member having a substantially perpendicularly extending shank portion provided with a slotted opening; an apertured angular head having a slotted opening normally coincident with said opening of said guide member; an apertured retaining plate adapted to clamp a removable cutting blade against the projecting portion of said head, and having a side opening recess therein; a pivot element connecting one end of said retaining plate to said head; a releasable bolt for securing the other end of said retaining plate to said head and normally passing through said plate recess, the projecting portions of said head and said guide member being spaced apart and extending in a common direction; and a removable handle releasably connected to and holding together said head and said guide member.

10. In a scraping and cutting device including a handle and detachably connected clamping head; a releasable retaining plate pivotally connected to said clamping head and adapted to hold a disposable cutting blade in a position extending away from said handle; and a substantially right angled guide member connected to said handle and having a portion thereof projecting beyond a mounted cutting blade and in common direction therewith whereby a mounted cutting blade will be guided with respect to a container edge.

11. In a scraping and cutting device including a handle and detachably connected clamping head having a slot therein; a releasable blade retaining plate pivotally connected to said clamping head and adapted to hold a disposable cutting blade; a substantially right angled guide member detachably connected to said handle and having a slot therein adapted to substantially coincide with said slot of said blade retaining plate, portions of said guide member extending beyond the normal position of a mounted blade.

12. In a scraping and cutting device including a handle and detachably connected clamping head having a slot therein; a handle; an adjustable bolt connecting said handle and said head; a movable plate on said head adapted to hold a cutting blade; said blade retaining plate being pivotally connected adjacent one end and having a blade engaging projection adjacent its other end; and releasable screw means on said clamping head for engaging said movable plate to hold a cutting element in desired position.

FRED M. GIDDINGS.